United States Patent
Jung et al.

(10) Patent No.: US 10,205,881 B2
(45) Date of Patent: Feb. 12, 2019

(54) MOBILE TERMINAL AND CONTROL METHOD THEREOF

(71) Applicant: LG ELECTRONICS INC., Seoul (KR)

(72) Inventors: Byungwook Jung, Seoul (KR); Jeeho Hyun, Seoul (KR); Kyunghee Kang, Seoul (KR); Sungbum Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/583,481

(22) Filed: May 1, 2017

(65) Prior Publication Data
US 2018/0103208 A1    Apr. 12, 2018

(30) Foreign Application Priority Data

Oct. 12, 2016    (KR) .................. 10-2016-0132275

(51) Int. Cl.
*H04N 5/232*    (2006.01)
*H04N 5/225*    (2006.01)

(52) U.S. Cl.
CPC ....... *H04N 5/23287* (2013.01); *H04N 5/2258* (2013.01); *H04N 5/2259* (2013.01); *H04N 5/23216* (2013.01); *H04N 5/23222* (2013.01); *H04N 5/23245* (2013.01); *H04N 5/23254* (2013.01); *H04N 5/23293* (2013.01)

(58) Field of Classification Search
CPC ........... H04N 5/23287; H04N 5/23293; H04N 5/2258; H04N 5/23254
See application file for complete search history.

(56) References Cited

U.S. PATENT DOCUMENTS

| | | | | |
|---|---|---|---|---|
| 9,665,260 B2* | 5/2017 | Lee | ..................... | G06F 3/04845 |
| 9,848,121 B2* | 12/2017 | Perez-Feliciano | ........................... | H04N 5/23222 |
| 9,992,412 B1* | 6/2018 | Tyagi | ................. | H04N 5/23238 |
| 10,056,115 B2* | 8/2018 | Campbell | .............. | H04N 9/806 |
| 2009/0128618 A1* | 5/2009 | Fahn | ..................... | G06K 9/2054 348/39 |
| 2011/0273572 A1* | 11/2011 | Tsuchida | .................. | G03B 5/00 348/208.4 |
| 2012/0050587 A1* | 3/2012 | Yamamoto | ........... | H04N 5/2258 348/262 |

(Continued)

FOREIGN PATENT DOCUMENTS

EP    1936956 A2    6/2008

*Primary Examiner* — Tsion B Owens
(74) *Attorney, Agent, or Firm* — Birch, Stewart, Kolasch & Birch, LLP

(57) ABSTRACT

A mobile terminal including a main body; an image sensor provided in the main body; a driving unit coupled to the image sensor and configured to change the posture of the image sensor in at least one of roll, pitch, and yaw directions; a sensing unit configured to sense movement information of a subject as an imaging target in an image input through the image sensor; a touch screen; and a controller configured to change the posture of the image sensor using the driving unit such that the image sensor tracks a movement of the subject based on the sensed movement information, and display guide information on the touch screen related to the movement information of the subject to guide a movement of the main body of the mobile terminal.

19 Claims, 14 Drawing Sheets

(56) References Cited

U.S. PATENT DOCUMENTS

2015/0029304 A1\* 1/2015 Park .................. H04N 5/23238
 348/36
2015/0207983 A1 7/2015 Kang et al.

\* cited by examiner

FIG. 4
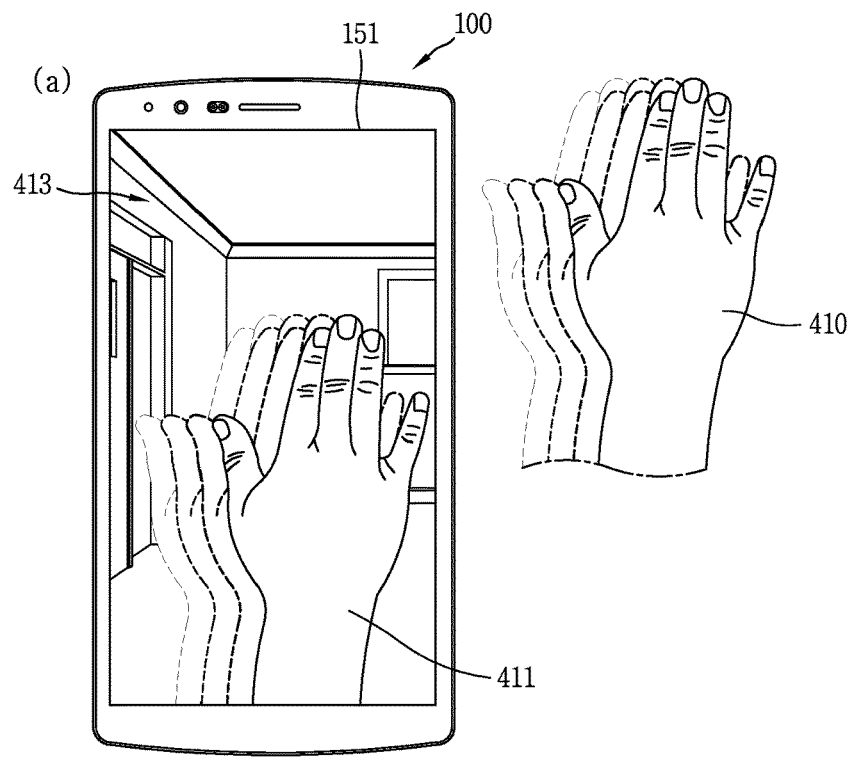
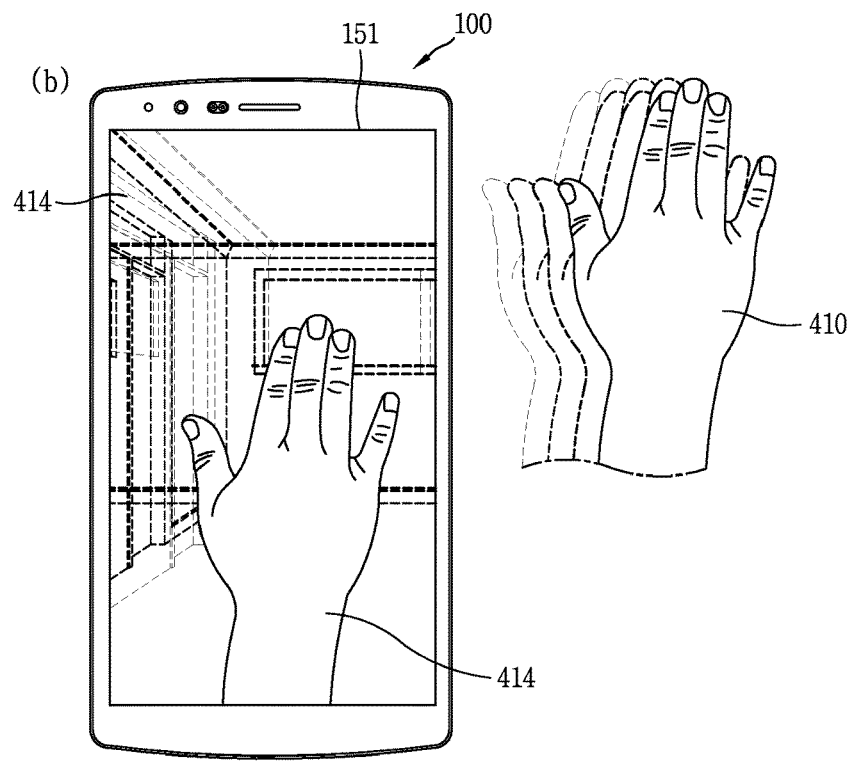

FIG. 5A
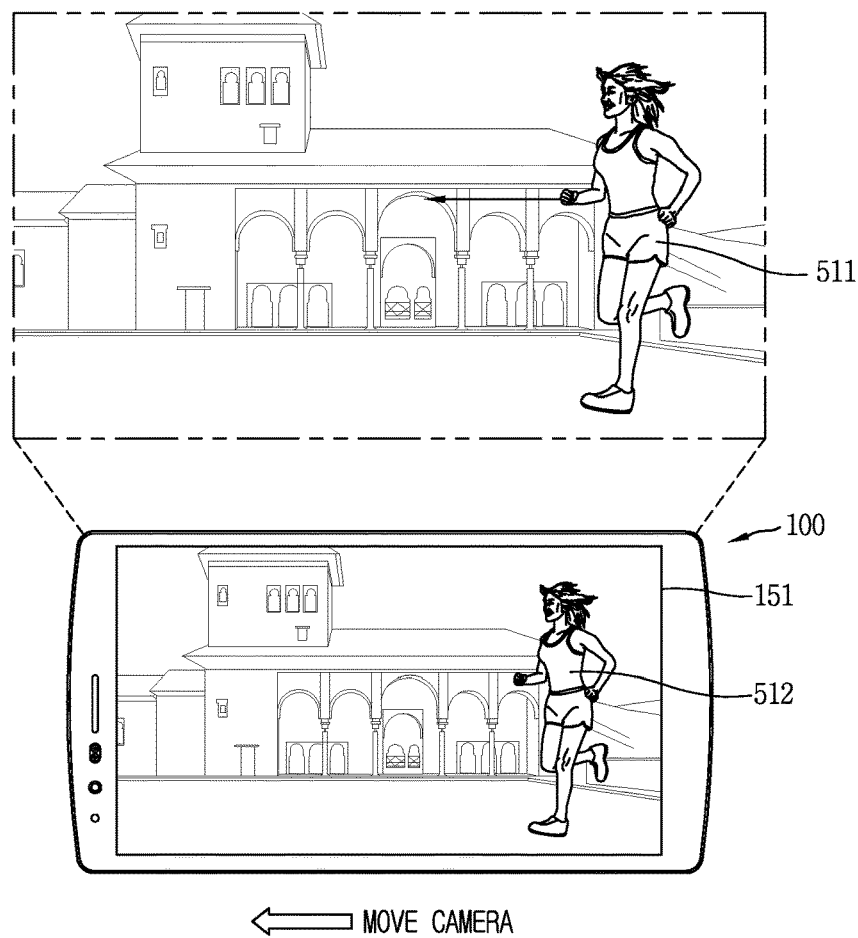

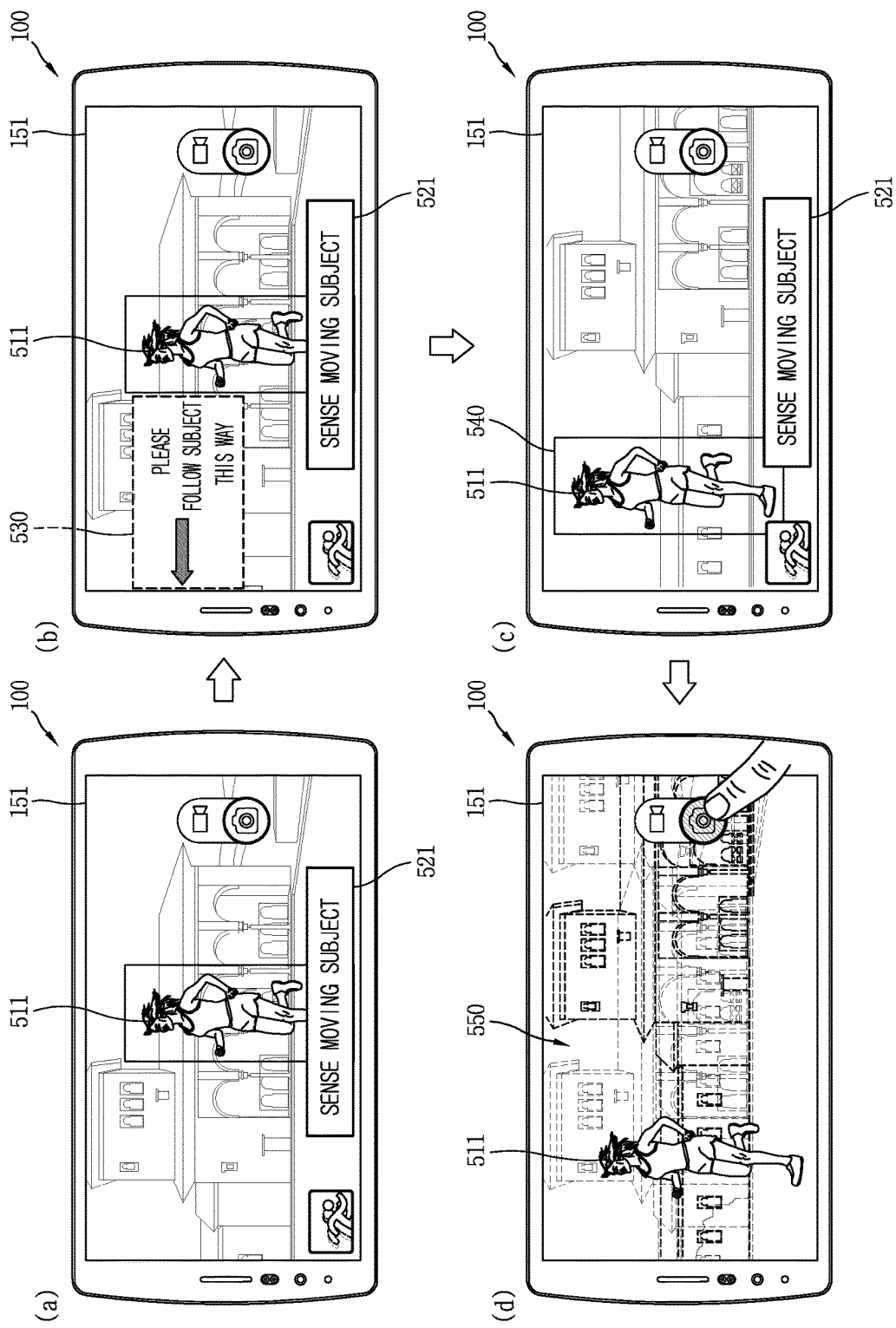

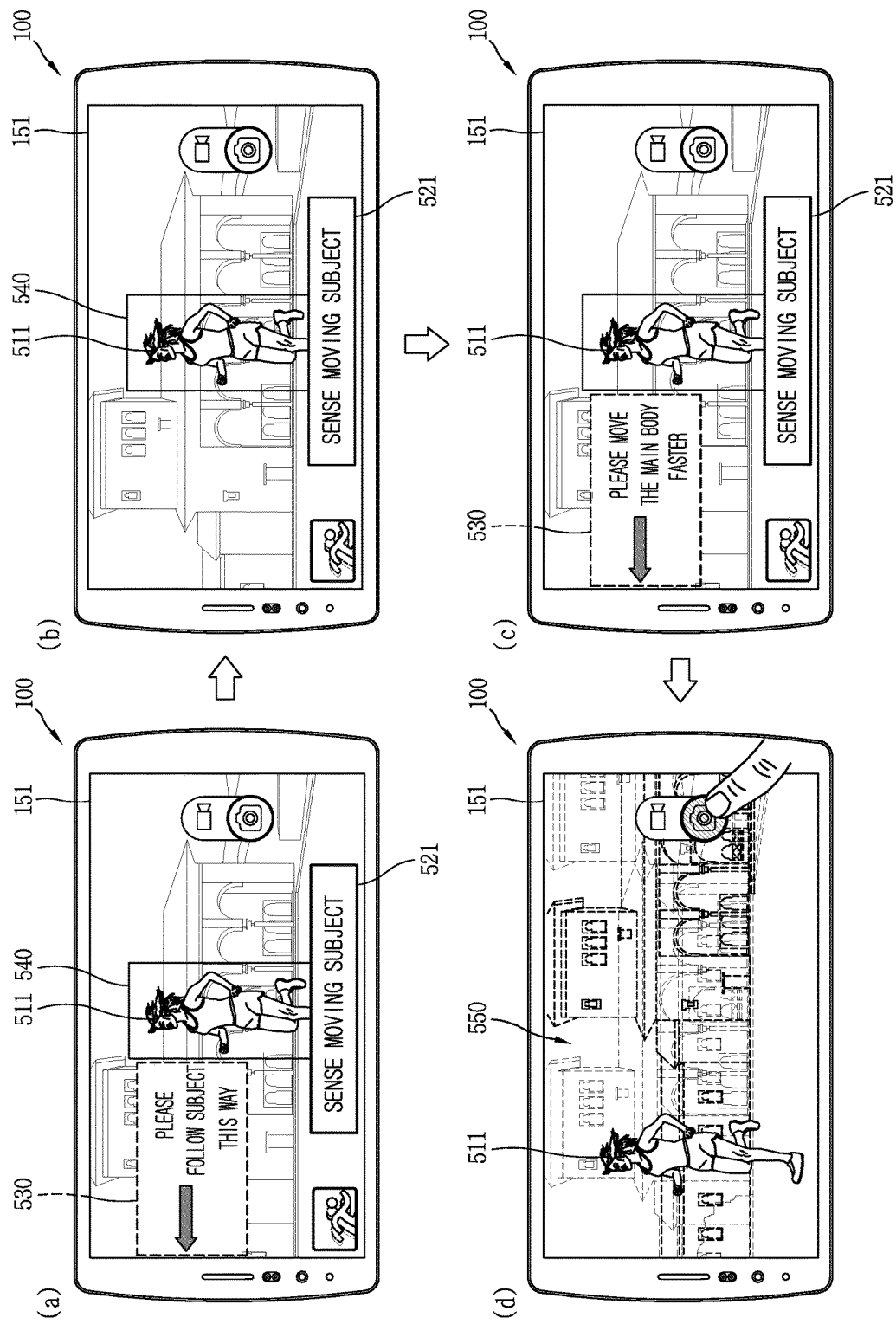

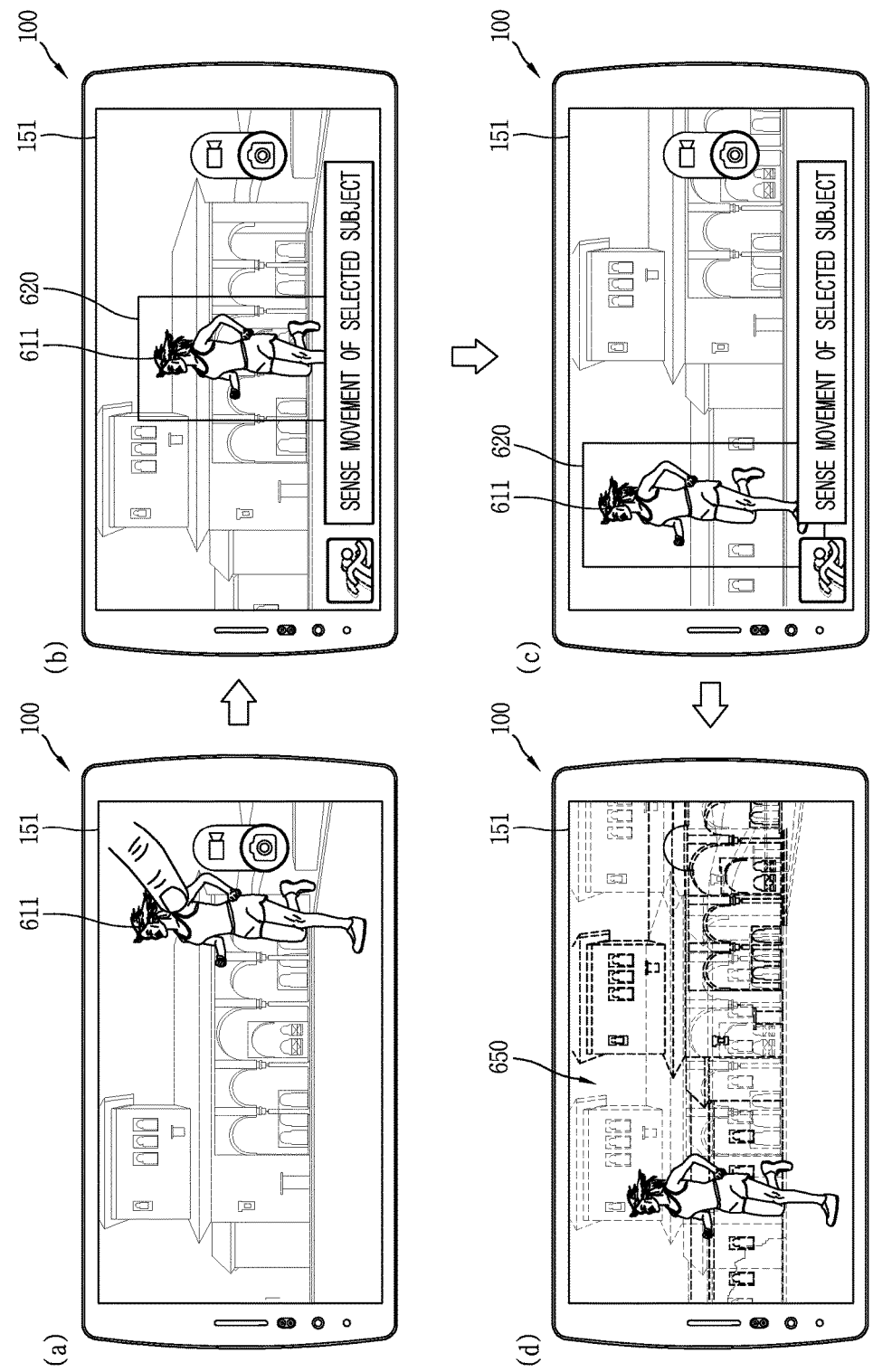

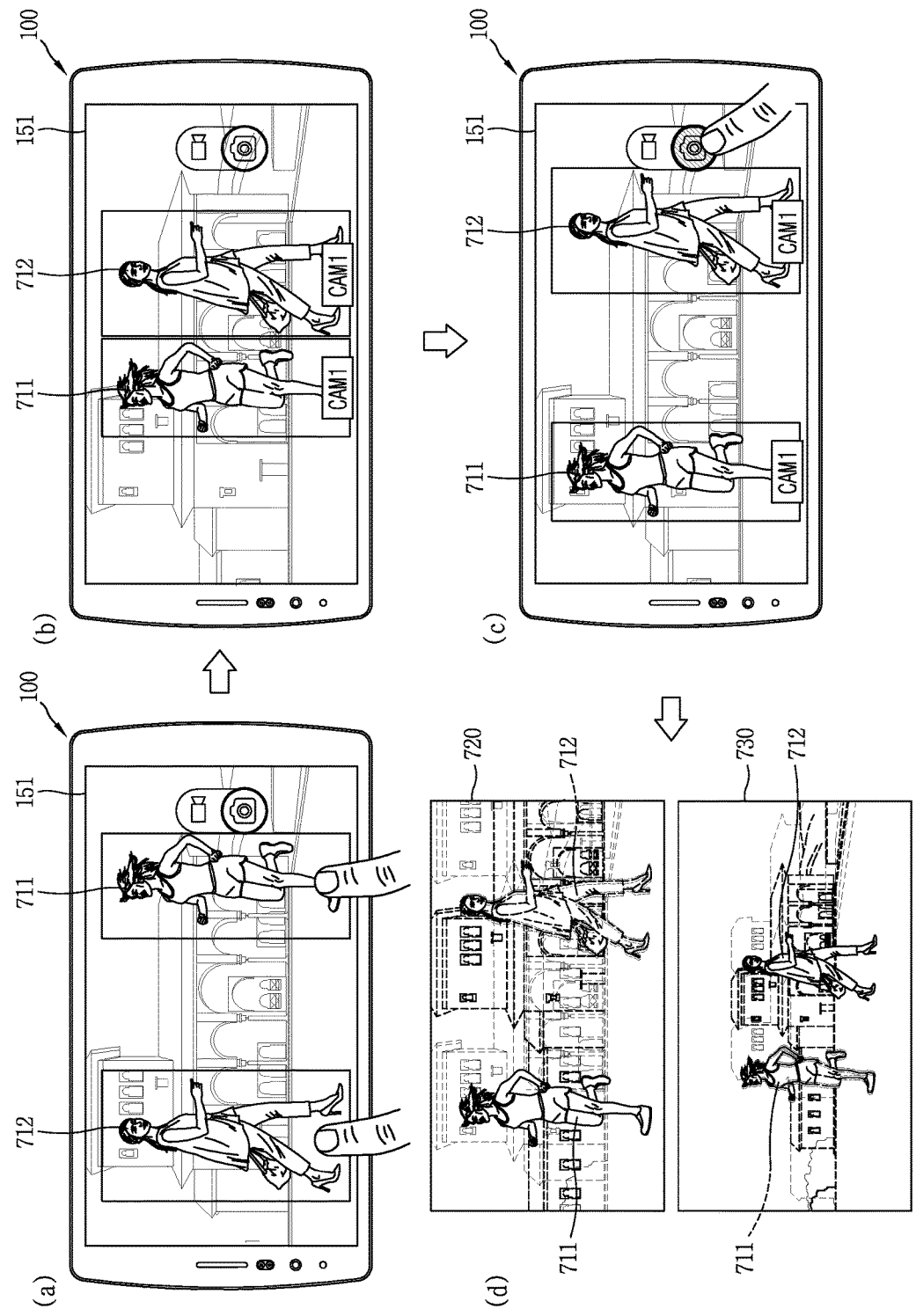

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2016-0132275, filed on Oct. 12, 2016, the content of which is incorporated by reference herein in its entirety.

BACKGROUND OF THE INVENTION

1. Field of the Invention

The present disclosure relates to a mobile terminal and a control method thereof.

2. Background of the Invention

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Meanwhile, as utilization of cameras provided in terminals has increased, functions for improving functions of cameras have been actively developed. As one of such improvements, improvement of various imaging techniques and imaging methods for accurately imaging a moving subject without a wobble is required.

SUMMARY OF THE INVENTION

Therefore, an aspect of the detailed description is to provide a mobile terminal capable of capturing an image of a moving subject without a wobble, and a control method thereof.

To achieve these and other advantages and in accordance with the purpose of this specification, as embodied and broadly described herein, a mobile terminal includes: a main body; an image sensor provided in the main body; a driving unit coupled to the image sensor to change a posture of the image sensor in at least one of roll, pitch, and yaw directions; a sensing unit sensing movement information of a subject as an imaging target in an image input through the image sensor; and a controller changing a posture of the image sensor using the driving unit such that the image sensor tracks movement of the subject based on the sensed movement information, wherein the controller controls a touch screen to output guide information related to movement information of the subject.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4, 5A, 5B, 5C and 5D are conceptual views illustrating a method for imaging a moving subject according to an embodiment of the present disclosure.

FIGS. 6A and 6B are conceptual views illustrating a method for setting an imaging method according to a user selection in the present disclosure.

FIGS. 7A and 7B are conceptual views illustrating a method for imaging a plurality of moving subjects in the present disclosure.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present.

In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
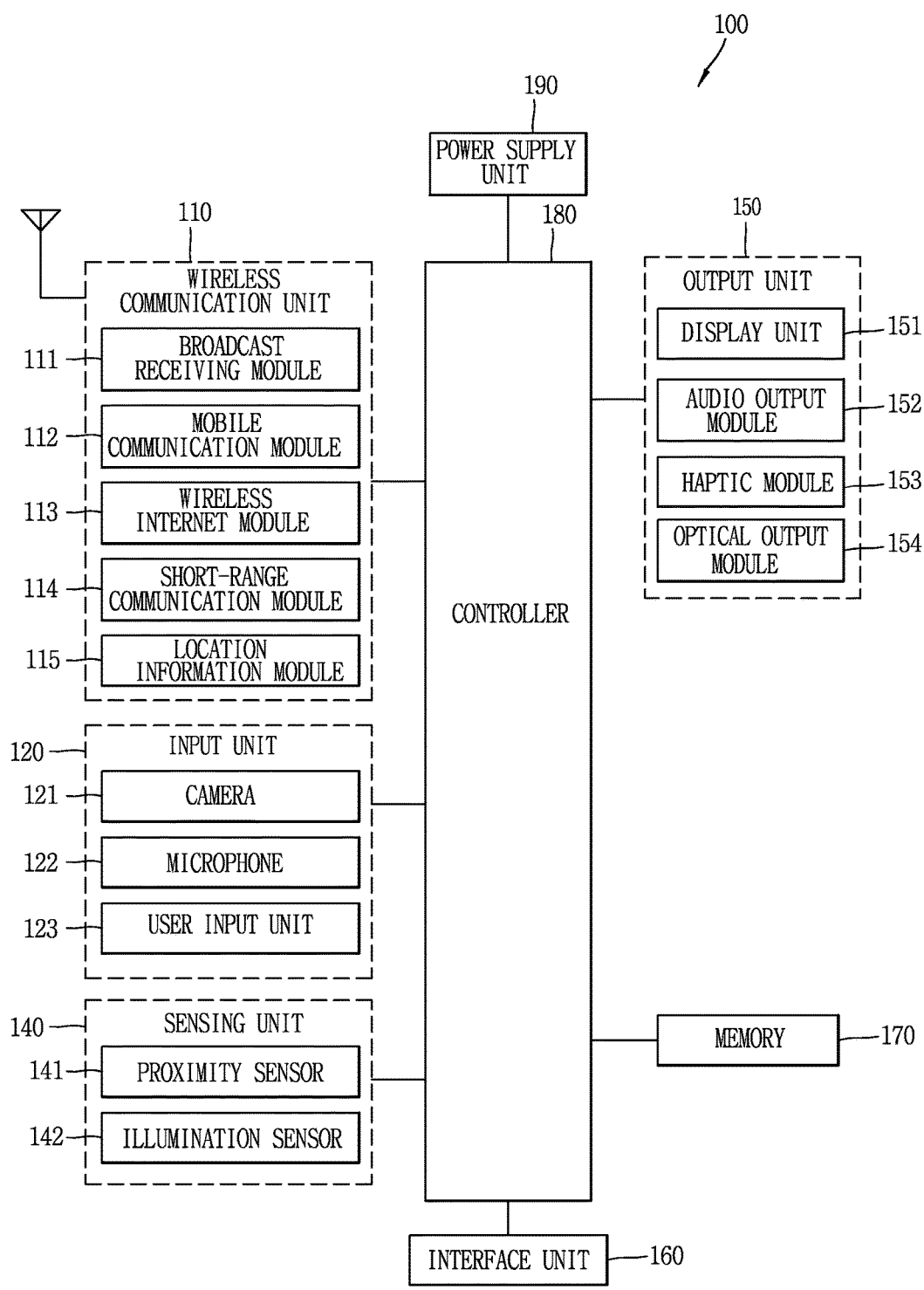
FIG. 1A is a block diagram of a mobile terminal according to an embodiment of the present disclosure.
Figure 1B:
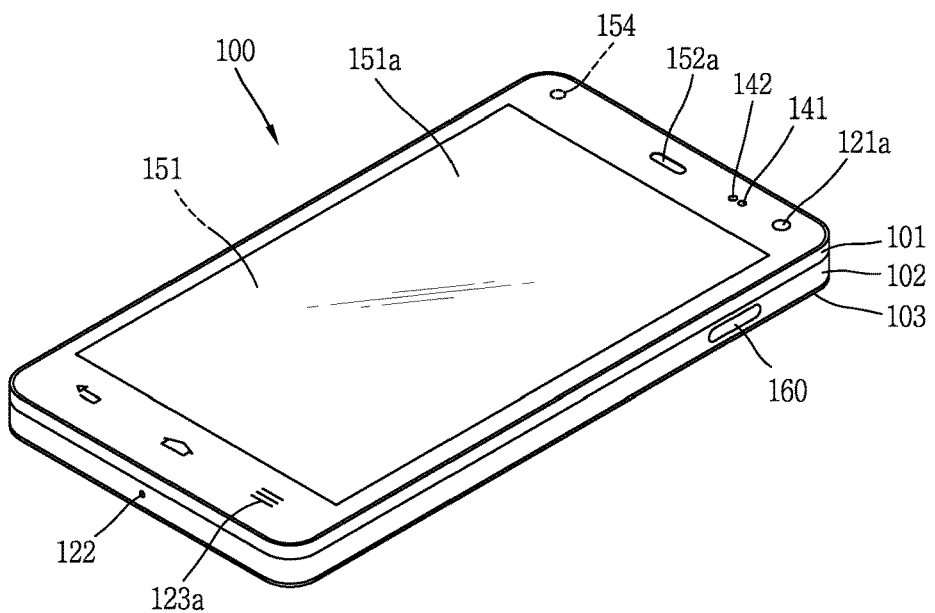
FIGS. 1B and 1C are conceptual views of one example of the mobile terminal, viewed from different directions.
Figure 1C:
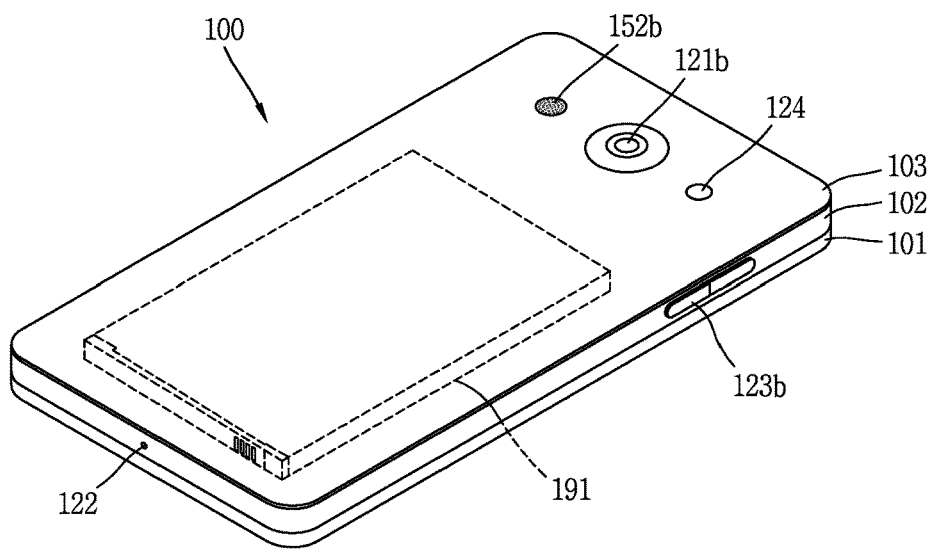

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a control unit 180, and a power supply unit 190. Implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia. It may be configured such that the sounds generated from the first audio output module 152a are released along an assembly gap between the structural bodies (e.g., between the window 151a and the front case 101). In this instance, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
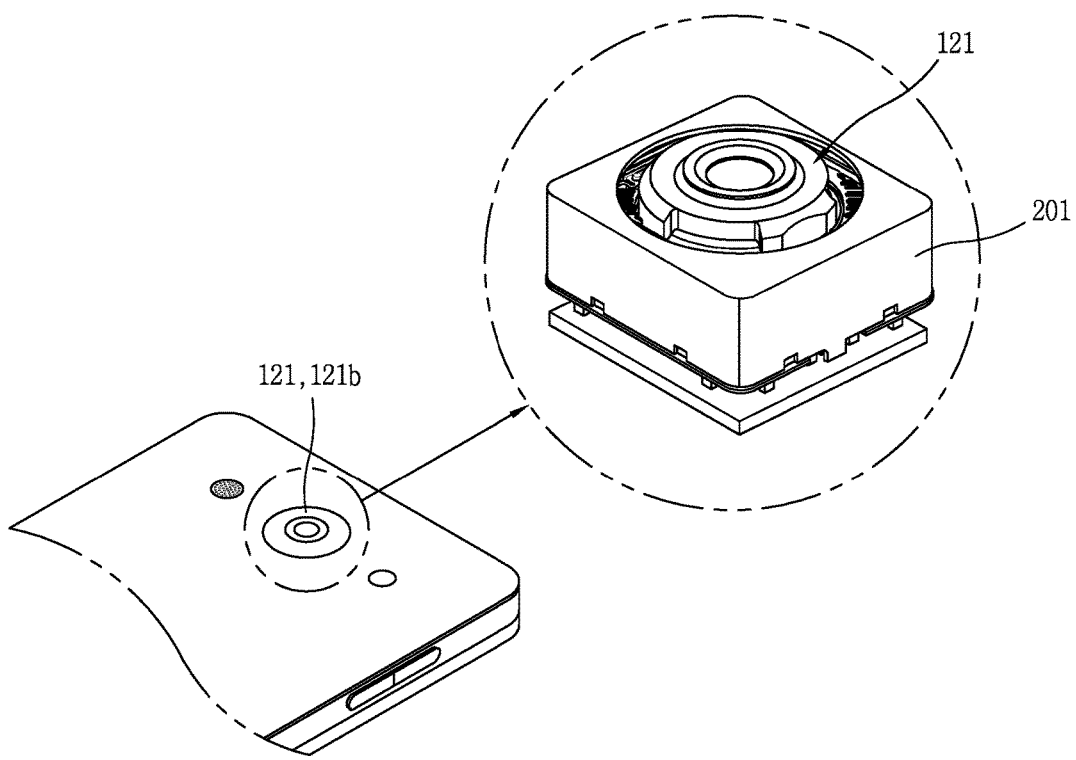
FIG. 2 is a conceptual view illustrating a camera according to an embodiment of the present disclosure.

The mobile terminal according to an embodiment of the present disclosure includes a camera on at least one of a front surface and a rear surface of the terminal body. At least one of the cameras provide in the present disclosure may have a driving unit for changing a posture of a camera, in particular, a posture of an image sensor. As illustrated in FIG. 2, the driving unit for changing a posture of the image sensor may be coupled to the camera 121 and change the image sensor in at least one of roll, pitch, and yaw directions.

The driving unit 201 may be variously implemented and have various structures, and in this disclosure, a structure and a shape of the driving unit 201 and a position relationship of the driving unit 201 with respect to the camera are not particularly limited. In addition, optical image stabilization (OIS) may be performed by utilizing the driving unit 201. OIS refers to change a posture of an image sensor through the driving unit 201 to enable the image sensor to move in a direction opposite to a direction in which the image sensor has moved, by sensing a shake of the camera, in particular, the image sensor, when an image is being captured. Performing OIS helps prevent capturing of a shaken image or an unfocused image due to a shake of the image sensor when an image is being captured.

The present disclosure provides a mobile terminal capable of capturing an image of a moving subject without a shake by utilizing the driving unit 201 which can perform OIS, and a control method thereof. The driving unit 201 mentioned in the following descriptions can capture an image of a moving subject, without being limited to the driving unit performing an OIS function.

Figure 3:
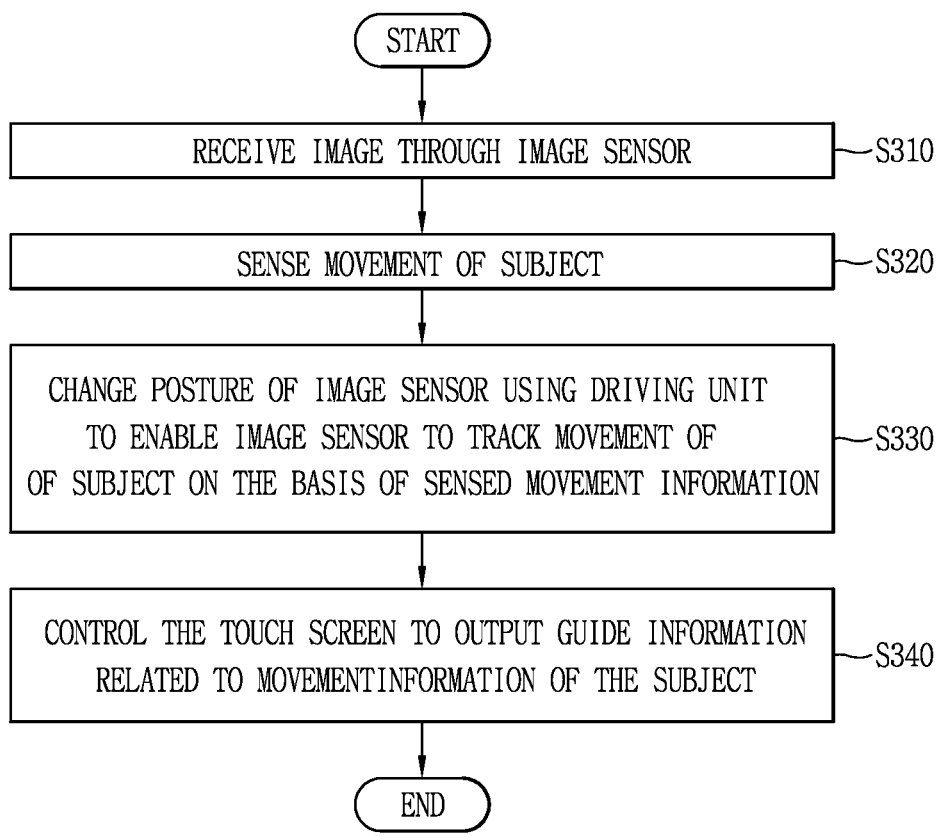
FIG. 3 is a flow chart illustrating a method for imaging a moving subject according to an embodiment of the present disclosure.

Hereinafter, a method for obtaining an image of a moving subject will be described in detail with reference to the accompanying drawings. In particular, FIG. 3 is a flow chart illustrating a method for imaging a moving subject and FIGS. 4, 5A, 5B, 5C and 5D are conceptual views illustrating a method for imaging a moving subject according to an embodiment of the present disclosure.

As discussed above, the mobile terminal according to an embodiment of the present disclosure includes the driving unit coupled to the image sensor to change a posture of the camera (hereinafter, referred to generally as an "image sensor") provided in the main body of the mobile terminal in at least one of roll, pitch, and yaw directions.

The driving unit can cause an image of a moving subject to be captured without a shake, by changing a posture of the image sensor. In more detail, when the image sensor is activated to capture an image, an image is received through the image sensor (S310) and movement of a subject as an imaging target is sensed (S320). The process of sensing the movement of the subject can be performed by the controller 180 or by the sensing unit 140 under the control of the controller 180.

In addition, movement of the subject can be sensed in various manners. For example, the controller 180 can sense a graphic object corresponding to the subject in an image input through the image sensor and sense a position movement of the graphic object in the input image to thus sense the movement of the subject. In another example, the controller 180 can actually sense the subject through a hardware component such as an infrared sensor, or the like, and sense the movement of the subject.

When the movement of the subject is sensed, a posture of the image sensor is changed by using the driving unit 201 such that the image sensor tracks movement of the subject, based on the movement information of the sensed subject (S330). Here, the controller 180 tracks the movement of the subject by moving the image sensor in at least one of the roll, pitch, and yaw directions as described above.

Thus, a position of the image sensor can be changed to view a direction in which the subject moves. In addition, the movement information of the subject includes at least one of a movement direction and a movement speed of the subject.

In more detail, the controller 180 can extract vector information of the subject using the movement information of the subject. Also, the controller 180 can obtain a change target posture information of the image sensor using a difference between the vector information of the subject and vector information of the main body including the image sensor.

Further, the controller 180 can control the driving unit 201 to change the posture of the image sensor based on the obtained posture information. Here, the extracted change target posture information of the image sensor can include vector information corresponding to a value obtained by subtracting the vector information of the main body from the vector information of the subject.

The controller 180 can change the posture of the image sensor such that the image sensor tracks the subject, based on or using the vector information corresponding to the value obtained by subtracting the vector information of the main body. Thus, since the image sensor tracks the subject, when the moving subject is imaged, the subject is prevented from being shaken to be imaged as much as possible.

As illustrated in (a) of FIG. 4, in the related art imaging method, when a subject 410 (e.g., the user's hand) as an imaging target moves, an image 413 in which the subject is shaken is obtained. That is, in the related art, since the image sensor is controlled irrespective of the movement of the subject, as the subject moves, the subject becomes unfocussed. Thus, a graphic object 411 corresponding to the subject 410 is imaged as if it was shaken.

However, according to an embodiment of the present disclosure, as illustrated in (b) of FIG. 4, since a posture of the image sensor is changed using the driving unit 201 to track the moving subject 410, focusing is maintained in the subject 410 and an image 414 based on the subject 410 without a shake is obtained. For a subject (e.g., background objects), other than the subject 410 as an imaging target, which are not tracking objects, a relatively shaken image 412 is obtained.

That is, according to an embodiment of the present disclosure, as illustrated in (a) of FIG. 5A, the image sensor (or the camera) is allowed to move toward a moving subject 511, excluding a value obtained by subtracting the vector information of the main body 100 of the mobile terminal from the vector information of the subject 511 in accordance with movement of the subject 511. Thus, an image obtained through the camera 121 is captured based on the moving subject 511, and as a result, as illustrated in (b) of FIG. 5A, a shake of a graphic object 512 corresponding to the moving subject 511 as a tracking target is minimized, and for a subject (e.g., background objects), other than the subject as an imaging target, which are not tracking objects, a relatively shaken image 513 is obtained.

The controller 180 can set a subject whose relative movement variation is gradually reduced based on the main body 100 of the mobile terminal, among subjects sensed through the image sensor and the main body 100 of the mobile terminal, as a tracking target. That is, when the image sensor moves in the same direction as that of the moving subject, the moving subject may move in the same direction as that of the image sensor, and in this instance, a distance between the image sensor and the moving subject is gradually reduced.

Further, the controller 180 can set the moving subject as an imaging target based on a movement variation between the image sensor and the subject. In addition, the controller 180 can change a posture of the image sensor based on the subject whose relative distance to the main body is gradually reduced, among subjects sensed through the image sensor.

The controller 180 can change the posture of the image sensor to track movement of the subject whose relative distance to the main body is gradually reduced. In this instance, the controller 180 can determine the subject whose relative distance to the image sensor (or the main body) is gradually reduced, among the subjects sensed through the image sensor, as an image target subject, and set a focus based on the corresponding subject.

Referring again to FIG. 3, when the posture of the image sensor is changed, the touch screen is controlled to output guide information related to the movement information of the subject on the touch screen (S340). Here, the guide information may include information related to movement of the main body such that the main body including the image sensor is guided to move according to movement of the subject. In addition, the information related to the movement of the main body may include at least one of information regarding a movement direction, a movement speed, a slope, and the posture of the main body.

That is, in the mobile terminal according to an embodiment of the present disclosure, as well as tracking the moving subject by changing the posture of the image sensor using the driving unit, the user can also move the main body of the mobile terminal to accurately track the moving subject. For example, when a moving subject 511 is sensed as illustrated in (a) of FIG. 5B, the controller 180 can output guide information 530 as illustrated in (b) of FIG. 5B. As illustrated, the guide information includes information regarding a direction in which the main body of the mobile terminal 100 is to move.

In addition, when the main body is being moved, the guide information may not be output any longer as illustrated in (c) of FIG. 5B. In another case, when a subject can be tracked by simply changing the posture of the image sensor, the touch screen 151 can be controlled such that guide information 530 is not output.

The controller 180 can also determine whether it is possible to track the movement of the subject by changing the posture of the image sensor, using the movement information of the subject (e.g., vector information of the subject) as described above. When it is impossible to track the movement of the subject by simply changing the posture of the image sensor according to the determination result, the controller 180 can control the touch screen 151 to output the guide information 530.

Meanwhile, when it is possible to track movement of the subject by simply changing the posture of the image sensor according to the determination result, the controller 180 can control the touch screen 151 not to output the guide information 530. The memory 170 provided in the mobile terminal according to an embodiment of the present disclosure can also store data regarding the posture change range (or the posture change driving range) of the image sensor, and the controller 180 can compare the data with movement information of the subject to determine whether a movement speed of the moving subject can be tracked by simply changing the posture of the image sensor.

When a value obtained by subtracting vector information of the main body from vector information of the subject is outside the posture change driving range of the image sensor, the controller 180 can output the guide information. The fact that movement of the subject 511 is being monitored may be visually indicated to the user through a guide image 540 output near the graphic object 511 corresponding to the subject or via display information 521.

Thus, In addition, as illustrated in (d) of FIG. 5B, an image regarding the moving subject 511 can be captured without a shake to the maximum level by tracking the subject through the image sensor or by tracking the subject using movement of the main body. For a subject (e.g., background objects), other than the subject 511 as an imaging target, which are not tracking objects, a relatively shaken image 550 is obtained.

As discussed above, a subject can be tracked through the movement of the main body, and information regarding the movement of the main body can be provided. As illustrated in (a) of FIG. 5C, the user can track the movement of the subject through the movement of main body, by recognizing a direction in which the main body is to move, through the guide information 530.

In this instance, the controller 180 can provide guide information regarding movement of the main body in detail or provide guide information fitting a current situation, by monitoring the movement of the subject moving in real time. That is, the guide information can be updated according to the movement of the subject. The fact that movement of the subject is being monitored may be visually indicated to the user through the guide image 540 output near the graphic object 511 corresponding to the subject or via display information 521.

For example, as illustrated in (b) and (c) of FIG. 5C, when a movement speed of the subject is changed (for example, when a movement speed of the subject is faster than an initially sensed movement speed), the controller 180 can output guide information 530 in accordance with a current situation of the subject such as "please move the main body faster." In another example, when a movement direction of the subject is changed, the controller 180 can include information regarding the changed movement direction of the subject in the guide information.

Thus, the controller 180 can cause a real-time movement situation of the subject to be sensed, and update guide information according to a real-time movement situation of the subject such that the main body may be moved according to movement of the subject, as well as the posture of the image sensor, according to the real-time movement situation of the subject.

In addition, when movement of the main body is sensed, the controller 180 can adjust the posture change range of the image sensor based on vector information in accordance with movement of the main body. That is, when it is possible to track the subject by simply moving the main body, the controller 180 can not change the posture of the image sensor. For a subject (e.g., background objects), other than the subject 511 as an imaging target, which are not tracking objects, a relatively shaken image 550 is obtained as shown in (d) of FIG. 5C.

The mobile terminal according to an embodiment of the present disclosure may have a plurality of image sensors having different angles of view, and the plurality of image sensors may be disposed together on any one surface of the main body of the mobile terminal. For example, the mobile terminal may include a first image sensor having a first angle of view and a second image sensor having a second angle of view wider than the first angle of view. Here, the second image sensor having the second angle of view may be termed a wide angle camera.

With the first image sensor activated, and when a movement degree of the subject is not within the posture change driving range of the image sensor, the controller 180 can activate the second image sensor having an angle of view wider than that of the first image sensor and control the second image sensor to track the subject. In this instance, an image received through the second image sensor can be output on the touch screen. That is, when an image received through the first image sensor is output on the touch screen, and when the second image sensor is activated, the image received through the second image sensor, instead of the image received through the first image sensor can be output on the touch screen.

When the subject can be tracked through the first image sensor according to movement of the main body, activation of the second image sensor may not be performed. However, when it is not possible to track movement of the subject through the first image sensor in consideration of a movement speed of the subject, or when the subject moves out of an angle of view of the first image sensor, the subject can be imaged through the second image sensor.

Figure 5D:
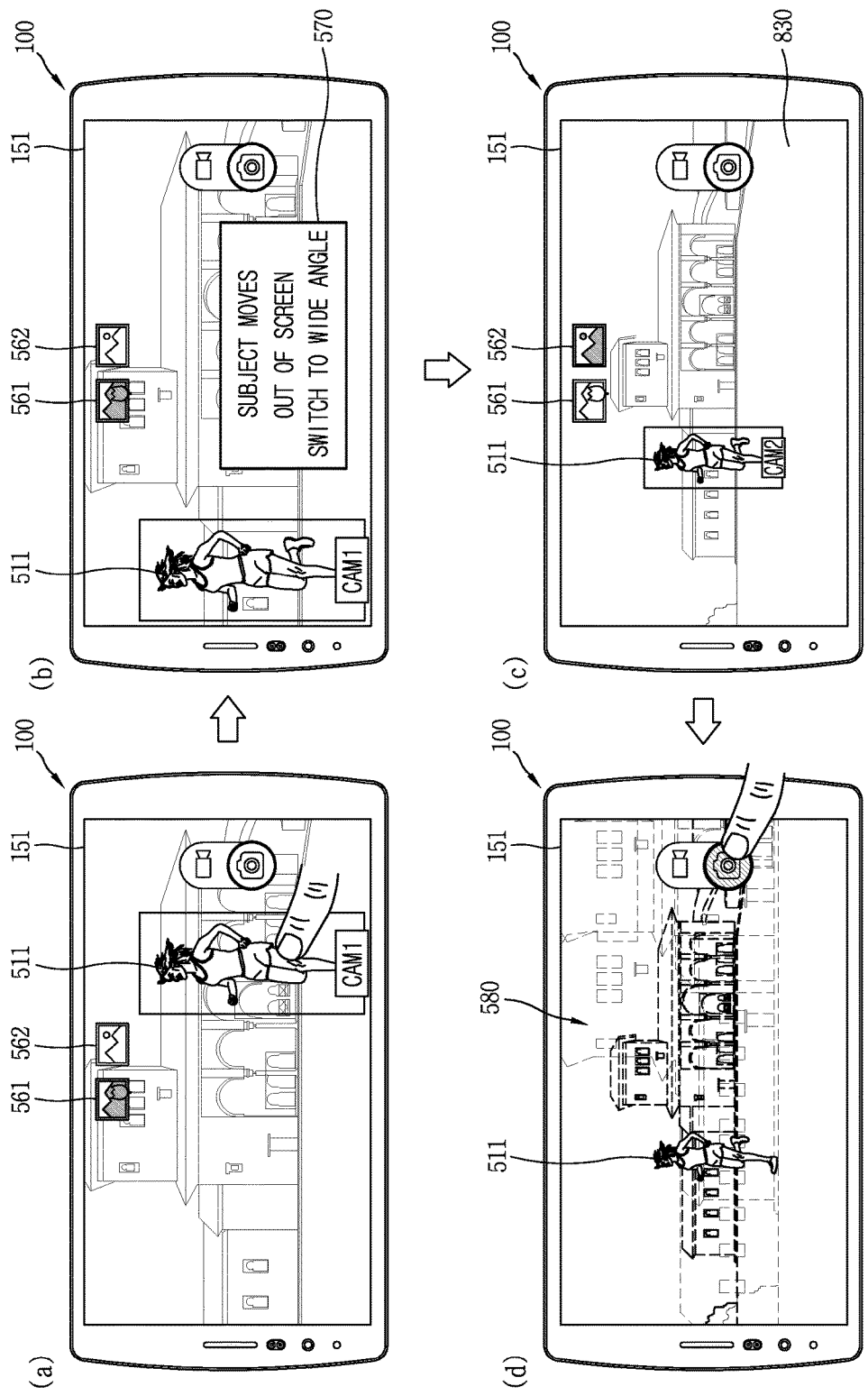

For example, when the first image sensor CAM1 is activated and the subject 511 is monitored through the first image sensor, and when the subject 511 moves out of the angle of view of the first image sensor as illustrated in (a) and (b) of FIG. 5D, the second image sensor CAM2 having an angle of view wider than that of the first image sensor may be activated as illustrated in (c) of FIG. 5D.

The controller 180 can activate the image sensor having a different angle of view in various cases such as i) based on a movement speed of the subject, ii) when the subject moves out of an angle of view of a currently activated image sensor, and iii) when the subject is positioned within a preset threshold range of an angle of view of a currently activated image sensor.

In this instance, an image (or a preview image) input through the second image sensor can be output on the touch screen 151 as illustrated in (c) of FIG. 5D, and an image captured through the second image sensor can be obtained in response to a user's image capture request as illustrated in (d) of FIG. 5D. Graphic objects 561 and 562 can also be displayed to indicate whether the sensor CAM1 is being used (highlighted graphic object 561) or whether the sensor CAM2 is being used (highlighted graphic object 562). For a subject (e.g., background objects), other than the subject 511 as an imaging target, which are not tracking objects, a relatively shaken image 580 is obtained as shown in (d) of FIG. 5D.

In addition, tracking (or monitoring) of the subject as described above can be performed when the camera (or the image sensor) is activated, and here, the image output on the touch screen can be a preview image received through the activated camera. Also, the controller 180 can continuously monitor the movement of the subject, and when an image capture request is received, the controller 180 can capture an image and store the captured image in the memory 170.

Here, the image capture request may be received in various manners. For example, the image capture request may be received when a camera function application is executed. The image capture request may also be a touch input applied to an icon to which the image capture request is linked (or associated), or a voice command corresponding to imaging may be received. Also, the image capture request may be received through a physical force applied to a hardware touch key or a push key to which the imaging command is associated. The imaging command may also be received even when a camera function application is not executed, and the camera function application may be executed after the imaging command is received.

According to the mobile terminal and the control method thereof according to an embodiment of the present disclosure as described above, by sensing the movement of a subject and changing the posture of the image sensor based on the sensed information, the image sensor can be controlled to track the moving subject. Thus, according to an embodiment of the present disclosure, the moving subject can be imaged without a shake, rather than a fixed image sensor.

Also, according to the mobile terminal and the control method thereof according to an embodiment of the present disclosure as described above, a vector value according to movement of the subject and a vector value of the mobile terminal can be compared such that the mobile terminal can move in a direction in which the subject moves. Also, movement information of the mobile terminal can be calculated based on the comparison result to output guide information regarding a direction in which the mobile terminal is to move, a movement speed of the mobile terminal, and the like. Thus, the user can image the moving subject without a shake by moving the mobile terminal based on the guide information.

In addition, the driving unit coupled to the image sensor in the mobile terminal according to an embodiment of the present disclosure can be utilized for two purposes, for example. One of the purposes is optical image stabilization (OIS). OIS refers to sensing a shake of a camera, in particular, an image sensor, in capturing an image and changing the posture of the image sensor through the driving unit 201 such that the image sensor can move in a direction opposite to a direction in which the image sensor has moved. When OIS is performed, capturing a shaken image due to a shake of the image sensor in capturing an image or capturing an unfocussed image can be prevented.

Another purpose is capturing an image of a moving subject without a shake as discussed above. In order to achieve the two purposes, the posture of the image sensor is changed differently. That is, for OIS, the driving unit is controlled to move the image sensor in a direction opposite to a direction in which the image sensor has moved, and for monitoring a moving subject, the driving unit is controlled to move the image sensor in a direction corresponding to a movement direction of the moving subject.

Thus, the posture of the image sensor can be changed differently according to which purpose the posture of the image sensor is to be changed. The controller 180 can also change the posture of the image sensor based on a user selection.

The mobile terminal 100 can also have different image sensor driving modes. A first driving mode may be an OIS mode and a second driving mode may be a subject tracking mode. Any one of the first and second driving modes may be present as a basic setting. Also, switching from any one of the first and second driving modes to the other can be performed based on a user selection or may be automatically performed according to movement of a subject.

Figure 6A:
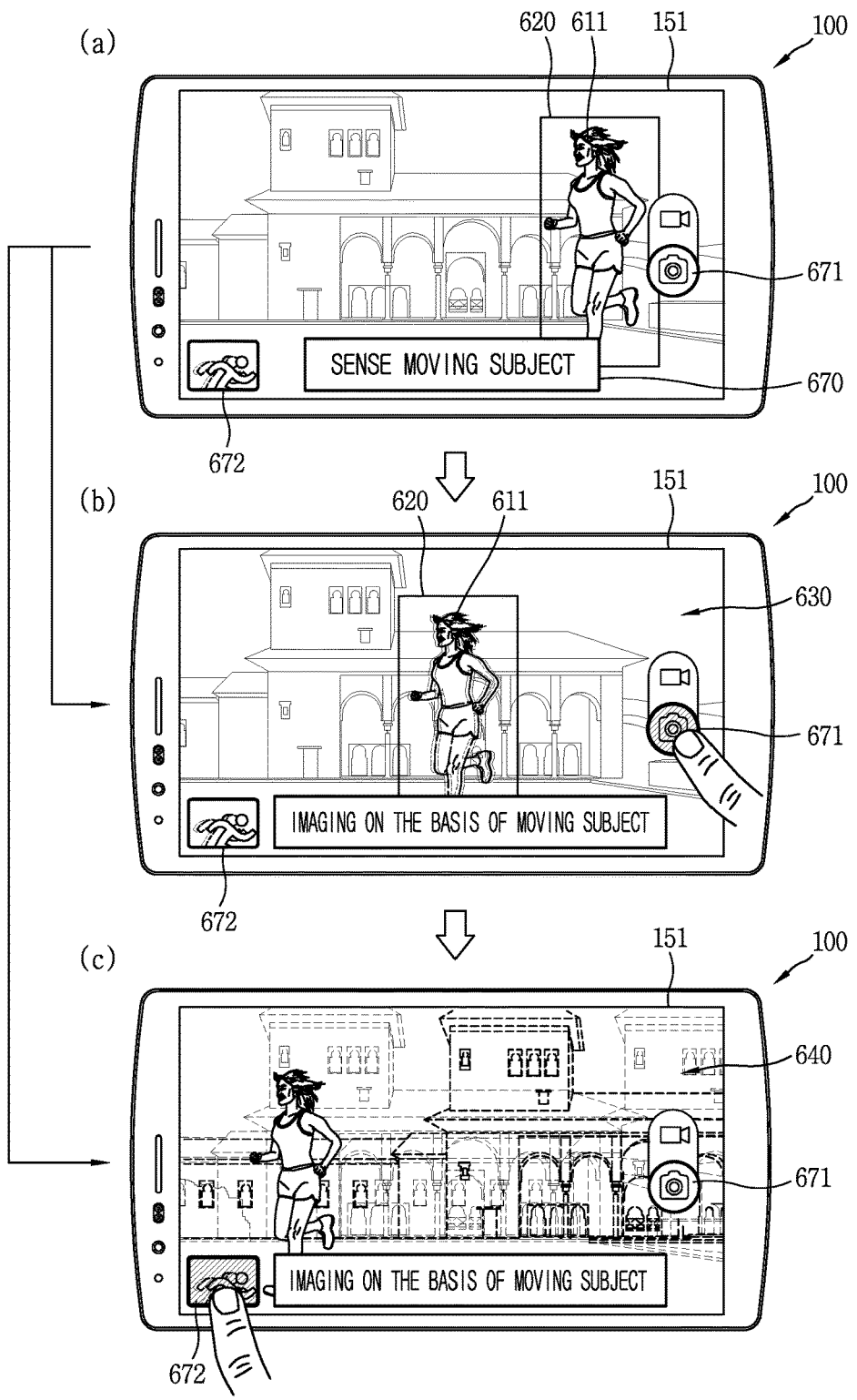

For example, as illustrated in (a) of FIG. 6A, when the first driving mode as an OIS mode is set as a basic operation mode, and when movement of the subject is sensed in a preview image, the controller 180 can output an indicator 670 including information such as "sensing moving subject". That is, when movement of a subject 611 is sensed, the controller 180 can output an indicator 670 indicating that the image sensor can track movement of the subject 611.

Also, when a preset type of touch is applied to the indicator, the controller 180 can control the driving unit 201 such that the image sensor tracks movement of the subject. In this instance, the controller 180 can switch a driving mode of the image sensor from the first driving mode as an OIS mode to the second driving mode as a subject tracking mode.

Or, the controller 180 can capture an image of the subject in any one of the first and second driving modes according to which graphic object an image capture request has been applied to. For example, as illustrated in (b) of FIG. 6A, a first image capture request graphic object (or an icon) 671 for capturing an image in the first driving mode and a second image capture request graphic object (or icon 672) for capturing an image in the second driving mode may be output together on the touch screen. Also, the controller 180 can capture an image by driving the image sensor according to each mode according to whether which of the first and second image capture request graphic objects 671 and 672 has been touched in a preset manner.

For example, as illustrated in (b) of FIG. 6A, when the first image capture request graphic object 671 is touched in a preset manner, the controller 180 can perform imaging by changing the posture of the image sensor according to a setting fitting the OIS mode and obtain image 630. Also, as illustrated in (c) of FIG. 6A, when the second image capture request graphic object 672 is touched in a preset manner, the controller 180 can perform imaging by changing the posture of the image sensor according to a setting fitting the subject tracking mode and obtain image 640. The fact that movement of the subject is being monitored can be visually indicated to the user through a guide image 620 output near the graphic object 611 corresponding to the subject.

As described above, in the mobile terminal according to an embodiment of the present disclosure, the controller 180 or the sensing unit can sense a moving subject and inform the user about the same. In addition, in the mobile terminal according to an embodiment of the present disclosure, subject monitoring can start based on a user selection.

Here, as illustrated in (a) of FIG. 6B, the user selection can be a user's touch applied to an object included in a preview image. As illustrated, the preview image may include a graphic object 611 corresponding to a subject as an imaging target, and, in response to a preset type of touch applied to the graphic object 611, the controller 180 can monitor movement of the subject corresponding to the graphic object 611 as illustrated in (b) and (c) of FIG. 6B.

The fact that movement of the subject is being monitored may be visually indicated to the user through a guide image 620 output near the graphic object 611 corresponding to the subject. Also, when tracking the subject in this manner, the controller 180 can capture an image of the moving subject without a shake to the maximum level by tracking the subject through the image sensor or by tracking the subject by moving the main body in response to a user's image capture request as illustrated in (d) of FIG. 6B. For a subject (e.g., background objects), other than the subject 611 as an imaging target, which are not tracking objects, a relatively shaken image 650 is obtained.

In the second driving mode for tracking a moving subject, since the image sensor is changed toward the moving subject in posture, the moving subject relatively moves in the same direction as that of the image sensor. Thus, the image sensor may recognize the moving subject as a stationary subject. In this instance, regarding the moving subject, an image without a shake may be obtained. Also, conversely, since an unmoving subject relatively moves in a direction opposite to the direction in which the image sensor moves, the image sensor may recognize the unmoving subject as a dynamic subject. Thus, in this instance, regarding the unmoving subject, a shaken image may be obtained.

Figure 7A:
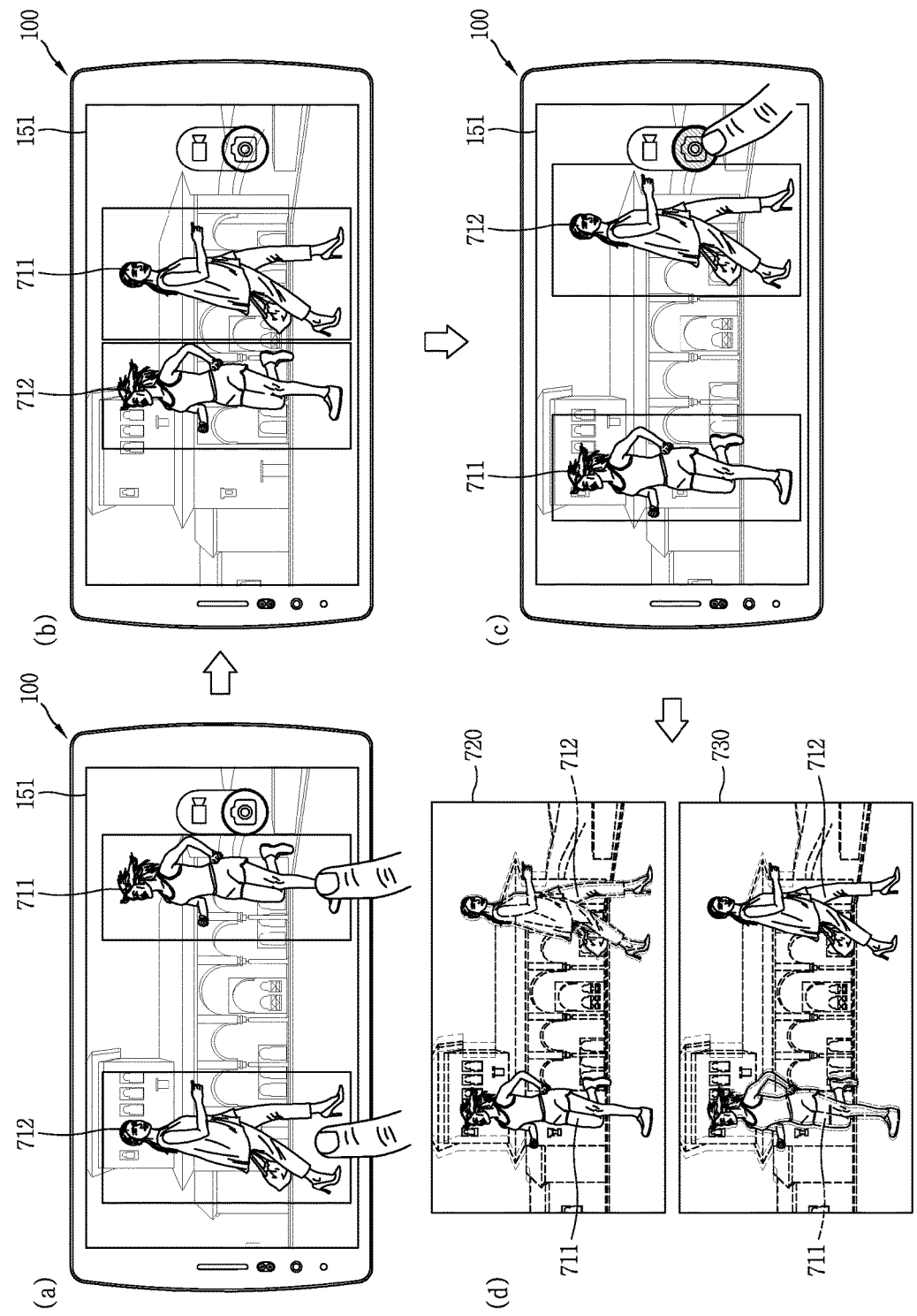

Next, FIGS. 7A and 7B are conceptual views illustrating a method for imaging a plurality of moving subjects in the present disclosure. In the mobile terminal according to an embodiment of the present disclosure, when subjects to be monitored are in plurality, the plurality of subjects can be monitored in various manners to capture an image of the plurality of subjects without a shake.

The controller 180 can sense movement of the plurality of subjects through an image input through the image sensor. In this instance, the controller 180 can output appropriate visual information to inform the user that movement of the plurality of subjects has been sensed.

Alternatively, a monitoring target subject can be selected by the user. As illustrated in (a) of FIG. 7A, a preview image input through the camera can be output on the touch screen 151, and the user can select at least one graphic object corresponding to a monitoring target subject, among graphic objects included in the preview image, through a preset type of touch.

For example, as illustrated, a first graphic object 711 and a second graphic object 712 may be selected. When a plurality of monitoring target subjects are selected under the control of the controller 180 or according to a user selection, the controller 180 can sense the movement of each of the plurality of subjects and calculate vector information regarding each of the plurality of subjects as illustrated in (b) of FIG. 7A. The controller 180 can also calculate movement information of the main body compared with each of the plurality of subjects and posture change information of the image sensor.

As illustrated in (c) of FIG. 7A, when an image capture request is received, the controller 180 can control the driving unit 201 such that the image sensor can sequentially track the plurality of subjects using movement information of each of the plurality of subjects, movement information of the main body, and posture change information of the image sensor.

That is, the controller 180 can obtain a first image 720 as illustrated in (d) of FIG. 7A by changing the posture of the image sensor based on a first subject corresponding to the first graphic object 711 and obtain a second image 730 as illustrated in (d) of FIG. 7A by changing the posture of the image sensor based on a second subject corresponding to the second graphic object 712.

Also, the controller 180 can synthesize a plurality of images captured by tracking each of the plurality of subjects, based on the plurality of subjects to generate a single image. That is, the controller 180 can synthesize the plurality of images to provide an image regarding the plurality of subjects without a shake to the user. In another example, when it is required to monitor a plurality of subjects, the controller 180 can activate both the first image sensor having a first angle of view and the second image sensor having a second angle of view wider than the first angle of view.

As illustrated in (a) and (b) of FIG. 7B, the controller 180 can image the first subject corresponding to the first graphic object 711 through the first image sensor and image the second subject corresponding to the second graphic object 712 through the second image sensor. As illustrated, a guide image showing which subject is tracked by which image sensor can be output together on the touch screen 151.

When an image capture request is received as illustrated in (c) of FIG. 7B, the controller 180 can capture images through the first and second image sensors and synthesize the captured images 720 and 730 to generate a single image as illustrated in (d) of FIG. 7B. Here, the first image sensor captures an image when the posture thereof is changed with respect to the first subject, and the second image sensor captures an image when the posture thereof is changed with respect to the second subject.

In addition, the controller 180 can determine which of subjects is to be monitored by which of the first and second image sensors based on relative positions, movement speeds, and movement directions of the plurality of subjects. For example, the controller 180 can cause an image regarding a subject having a higher movement speed to be captured through an image sensor having a relatively wide angle of view.

Figure 8:
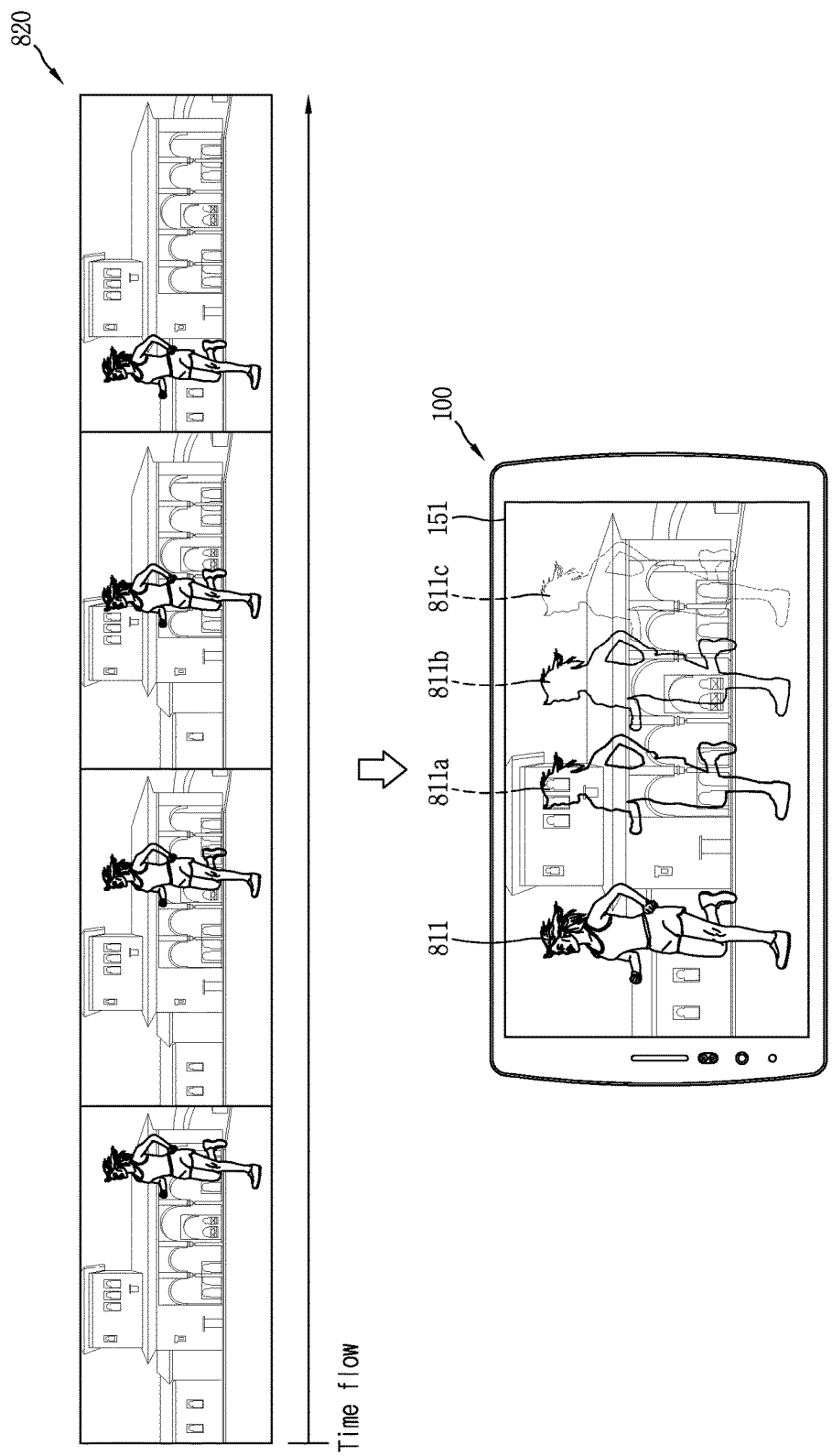
FIG. 8 is a conceptual view illustrating a method for synthesizing images regarding a moving object in the present disclosure.

Next, FIG. 8 is a conceptual view illustrating a method for synthesizing images regarding a moving object in the present disclosure. In the mobile terminal according to an embodiment of the present disclosure, as illustrated in FIG. 8, imaging can be performed at a preset time interval according to movements (811c→811b→811a→811) of a subject 811. Also, as illustrated, the captured images can be synthesized according to the passage of time to provide a single image. The images can be synthesized and provided in various manners, and, for example, an image synthesized to a file of a gif format can be provided.

As described above, in the mobile terminal and the control method according to an embodiment of the present disclosure, by sensing movement of a subject and changing the posture of the image sensor based on the sensed information, the image sensor can be controlled to track the moving subject. Thus, according to an embodiment of the present disclosure, the moving subject can be imaged without a shake, rather than by a fixed image sensor.

In addition, in the mobile terminal and the control method according to an embodiment of the present disclosure, a vector value according to movement of a subject and a vector value of the mobile terminal can be compared such that the mobile terminal can move in a direction in which the subject moves. Also, movement information of the mobile terminal is calculated based on the comparison result to output guide information regarding a direction in which the mobile terminal is to move, a movement speed of the mobile terminal, and the like. Thus, the user can image the moving subject without a shake by moving the mobile terminal based on the guide information.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a main body;
    an image sensor provided in the main body;
    a driving unit coupled to the image sensor and configured to change a posture of the image sensor in at least one of roll, pitch, and yaw directions;
    a sensing unit configured to sense movement information of a subject as an imaging target in an image input through the image sensor;
    a touch screen; and
    a controller configured to:
    operate in one a first mode or a second mode, wherein the first mode corresponds to correcting a shaking occurring in a capture image caused by a movement of the subject via an optical image stabilization (OIS) procedure by changing the posture of the image sensor through the driving unit to enable the image sensor to move in a direction opposite to a direction in which the image sensor has moved, wherein the second mode corresponds to correcting the shaking occurring in the capture image caused by the movement of the subject by moving the image sensor in a direction corresponding to a movement direction of the moving subject, and control the driving unit to change the posture of the image sensor using the driving unit such that the image sensor tracks a movement of the subject based on the sensed movement information.

2. The mobile terminal of claim 1, wherein the controller is further configured to control the touch screen to display guide information on the touch screen related to the movement information of the subject, and wherein the guide information includes information related to a movement of the main body such that the main body of the mobile terminal is guided to move according to the movement of the subject.

3. The mobile terminal of claim 2, wherein the information related to the movement of the main body includes at least one of information regarding a movement direction, a movement speed, a slope, and a posture of the main body.

4. The mobile terminal of claim 2, wherein the controller is further configured to:

determine whether it is possible to track the movement of the subject through a change in the posture of the image sensor using the movement information of the subject in the second mode, and when it is not possible to track the movement of the subject through the change in the posture of the image sensor, display the guide information on the touch screen in the second mode.

5. The mobile terminal of claim 1, wherein the controller is further configured to:

extract vector information of the subject using the movement information of the subject in the second mode, obtain change target posture information of the image sensor using a difference between the vector information of the subject and vector information of the main body in the second mode, and control the driving unit to change the posture of the image sensor based on the obtained change target posture in the second mode.

6. The mobile terminal of claim 5, wherein the posture information includes vector information corresponding to a value obtained by subtracting the vector information of the main body from the vector information of the subject.

7. The mobile terminal of claim 6, wherein the controller is further configured to control the touch screen to display guide information on the touch screen related to the movement information of the subject, and wherein when the value obtained by subtracting the vector information of the main body from the vector information of the subject is not within a posture change driving range of the image sensor, the controller is further configured to display the guide information on the touch screen.

8. The mobile terminal of claim 1, wherein the controller is further configured to:

when the movement of the subject is sensed, change the posture of the image sensor using the driving unit such that the image sensor is oriented in the movement direction of the subject, and when the movement of the main body is sensed and the movement of the subject is not sensed, change the posture of the image sensor using the driving unit such that the image sensor is oriented in a direction opposite to a movement direction of the main body.

9. The mobile terminal of claim 1, wherein the image sensor includes a first image sensor having a first angle of view and a second image sensor having a second angle of view wider than the first angle of view, and when a movement degree of the subject is not within a posture change driving range of the image sensor and the first image sensor is activated, the controller is further configured to activate the second image sensor having the angle of view wider than that of the first image sensor in the second mode.

10. The mobile terminal of claim 1, wherein the image sensor includes a first image sensor having a first angle of view and a second image sensor having a second angle of view wider than the first angle of view, and when the subject moves out of the angle of the view of the first image sensor and the first image sensor is activated, the controller is further configured to activate the second image sensor having the second angle of view wider than that of the first image sensor in the second mode.

11. The mobile terminal of claim 1, wherein the controller is further configured to:

when the movement of the subject is sensed, display an indicator indicating that it is possible for the image sensor to track the movement of the subject, and when a preset type of touch is applied to the indicator, control the driving unit such that the image sensor tracks the movement of the subject.

12. The mobile terminal of claim 1, wherein when the image sensor senses that a plurality of subjects move through the image input through the image sensor, the controller is further configured to control the driving unit such that the image sensor sequentially tracks each of the plurality of subjects, and synthesize a plurality of images captured by tracking each of the plurality of subjects, based on the plurality of subjects.

13. The mobile terminal of claim 12, wherein the controller is further configured to:

capture a first image by changing the posture of the image sensor with respect to a first subject among the plurality of subjects, and after capturing the first image, capture a second image by changing the posture of the image sensor with respect to a second subject different from the first subject among the plurality of subjects.

14. The mobile terminal of claim 1, wherein the image sensor includes a first image sensor having a first angle of view and a second image sensor having a second angle of view wider than the first angle of view, and when the image sensor senses that a plurality of subjects move, through an image input through the image sensor, the controller is further configured to:

activate both the first and second images sensors, change a posture of the first image sensor based on movement of any one of the plurality of subjects, and change a posture of the second image sensor different from the first image sensor based on movement of another subject different from the any one subject among the plurality of subjects.

15. The mobile terminal of claim 14, wherein when an image capture request is received, the controller is further configured to capture images respectively through the first and second image sensors, and synthesize the captured images to generate a single image.

16. The mobile terminal of claim 1, wherein the controller is further configured to change the posture of the image sensor with respect to a subject whose relative distance to the main body is gradually reduced, among subjects sensed through the image sensor in the second mode.

17. The mobile terminal of claim 16, wherein the controller is further configured to change the posture of the image sensor to track movement of the subject whose relative distance to the main body is gradually reduced.

18. The mobile terminal of claim 16, wherein the controller is further configured to set the subject whose relative movement variation with respect to the main body is gradually reduced among subjects sensed through the image sensor, as a subject as a tracking target through the image sensor.

19. The mobile terminal of claim 1, wherein the controller is further configured to:
display a first icon for selecting the first mode, and
display a second icon for selecting the second mode.

* * * * *